April 21, 1970     C. G. LANCASTER     3,507,468
APPARATUS FOR DETECTING CHANGES IN PRESSURE
Filed April 10, 1968
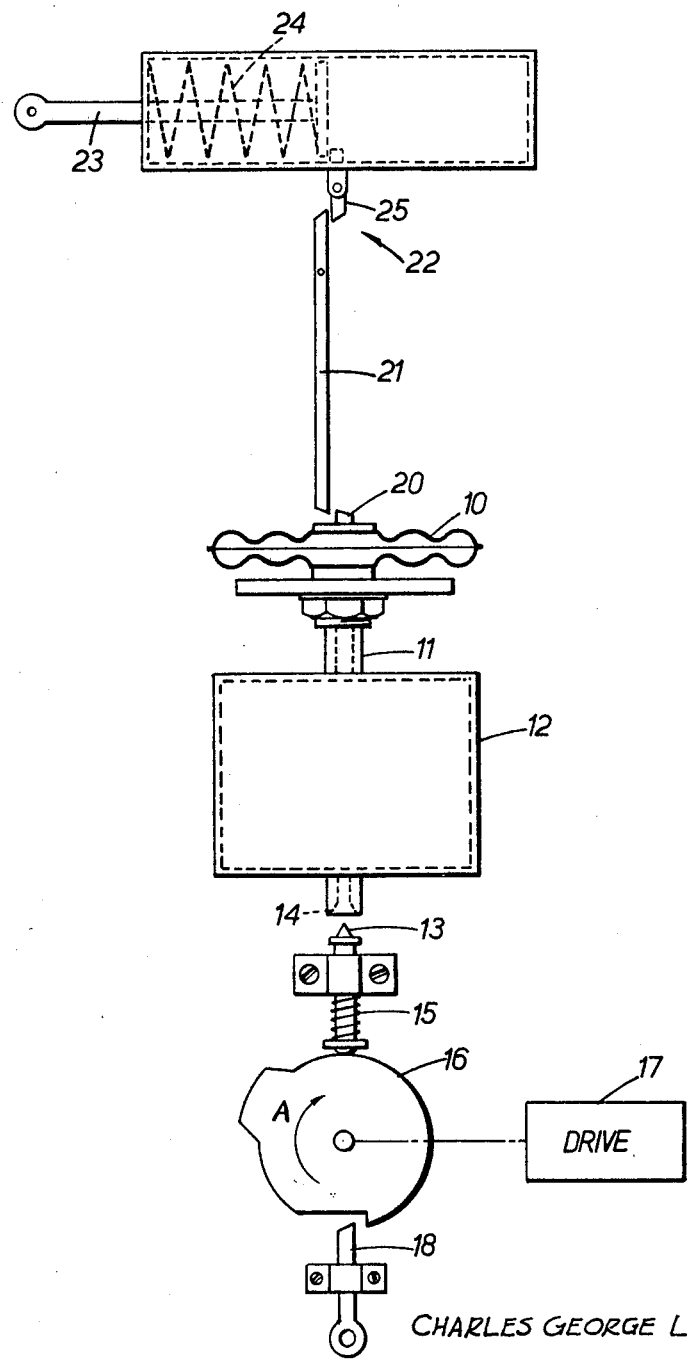
INVENTOR:
CHARLES GEORGE LANCASTER
BY Parrott, Bell, Seltzer, Park & Gibson
ATTORNEYS.

United States Patent Office 3,507,468
Patented Apr. 21, 1970

3,507,468
APPARATUS FOR DETECTING CHANGES IN PRESSURE
Charles George Lancaster, Basingstoke, England, assignor to Appleby & Ireland Limited, Basingstoke, Hampshire, England, a British company
Filed Apr. 10, 1968, Ser. No. 720,116
Claims priority, application Great Britain, Aug. 22, 1967, 38,673/67
Int. Cl. B64d 17/48
U.S. Cl. 244—150                    6 Claims

ABSTRACT OF THE DISCLOSURE

Apparatus responsive to changes in pressure during a predetermined time and particularly for controlling the release of a reserve parachute comprises a capsule normally subjected to atmospheric pressures inside and outside but with a valve for closing the passage to the interior and a timer to close the valve for a predetermined period. If the timer is set in operation when a parachutist jumps, e.g., by the static line, then, should the main parachute not open, the larger pressure change due to the rapid change in height will cause the capsule deflection, during the time the valve is closed, to exceed a predetermined amount. The capsule then operates a trip mechanism to release a reserve parachute.

---

This invention relates to apparatus for detecting changes in pressure and finds particular application in apparatus for detecting whether or not a pressure change exceeds a predetermined amount either from a predetermined pressure or in a predetermined time period.

According to this invention, apparatus for detecting changes in pressure comprises a pressure responsive element giving an output, e.g. a mechanical movement, dependent on the difference of two applied pressures, interconnecting means to equalise the two pressures and controllable means for temporarily inhibiting change of one of said applied pressures. The apparatus thus provides an output dependent on the change of pressure difference during any period when said controllable means temporarily inhibits any change in one of the applied pressures.

The pressure responsive elements of the apparatus conveniently comprises a pressure capsule within a chamber and said interconnecting means conveniently comprises a fluid passage for applying an external pressure, e.g. atomspheric pressure, to both the inside of the capsule and the chamber. A valve in the connection to either the chamber or the capsule enables the pressure fluid either in the chamber or the capsule to be sealed off and the device is then responsive to the change in applied pressure during the period the valve is closed. However, if one of the pressures is always to be atmospheric pressure, there is no need for a separate chamber to contain a capsule and, in this case, the pressure responsive means may comprise a pressure capsule externally subjected to atmospheric pressure and having a passage from the interior of the capsule with a valve to enable air in the capsule to be sealed off from the atmosphere. The valve constitutes the aforesaid controllable means for temporarily inhibiting change of one applied pressure.

The above-described apparatus is responsive to changes of pressure so long as said valve is closed. It may be required however to detect changes of pressure during a predetermined time period. In this case, the aforementioned controllable means for temporarily inhibiting change of one of said applied pressures may comprise a timing device for controlling the operation of said valve.

Conveniently the timing device includes a timer cam controlling said valve.

This device finds particular application for the control of parachutes to effect opening of a reserve parachute in the event of the person (or load) falling too fast. For this purpose, the ambient atmospheric pressure is normally applied to both sides of the pressure responsive element, and the aforementioned valve is closed at a suitable time instant after the drop has started, the time being such that the main parachute should have opened and the person or load should be falling slowly. The aforementioned timing device, in this case, may be arranged to maintain the valve closed for a predetermined period and then to reopen it or to allow it to reopen. If the rate of fall is slow, then there will only be a small pressure change before the valve reopens at the end of this period. If however the main parachute is not operating correctly and the rate of fall is too fast, then there will be a much larger pressure change and the movement of the pressure responsive device may be arranged to operate a trip mechanism for opening the reverse parachute. With the present invention, there is no need at all to set any device in accordance with barometric pressure. The initially open valve automatically maintains the pressure on the two sides of the pressure responsive device, i.e., the pressures inside and outside the capsule if a capsule is employed, equal irrespective of the actual pressure; the device thus operates the trip mechanism if the change of pressure exceeds a predetermined amount during the time period that the valve is closed.

Initiation of operation of the apparatus may be effected in any one of a number of ways. It may for example be started at a predetermined time (e.g., 5 seconds) after the parachutist jumps or after the main parachute is opened. This delay may be determined by a timer; conveniently the same timing device is used to give this delay as is employed for operating the valve. If the valve is operated by a cam, the cam may be shaped to provide the delay before the valve is open.

When the capsule is employed to contain the reference pressure and the valve is arranged in the connection to the interior of the capsule, then, when this valve is closed and as the pressure outside the capsule changes creating a differential pressure across the capsule causing it to deflect, the volume of the capsule must change slightly with a consequent change in the reference pressure. A compensating chamber having a volume in excess of that of the capsule may be provided in the connection between the valve and the capsule. In a typical construction, this might have a volume 1000 times as great as the volume change of this capsule for the predetermined pressure change and thus change in the volume of the capsule will give negligible change in the pressure of the total volume of air in the capsule and compensating chamber.

One embodiment of the invention is shown in the accompanying drawing which illustrates a device for operating a reserve parachute if the parachutist (or load) is falling too fast.

In the drawing there is shown a pressure responsive capsule 10 the interior of which is connected by a pipe 11 to a compensating chamber 12 having a volume much greater than any change in volume of the capsule. A valve 13 cooperating with a valve seat 14 is provided for sealing the chamber 12. When the valve is open, the pressure in the chamber 12 and capsule 10 is atmospheric. In the drawing the valve 13 is shown in the open position into which it is urged by a spring 15 which forces the valve member against a timer cam 16. This timer cam is rotatably driven in the direction indicated by the arrow A by means of a drive shown diagrammatically at 17. Rotation of the cam is inhibited by a pin 18 until that pin is withdrawn. The pin 18 may be withdrawn, for example, by being connected to the static line from the aircraft so that it is automatically withdrawn after the parachutist jumps. The timer cam 16 is shaped so that, after it starts to turn, there is a delay period before the valve 13 is closed. This delay period is to give time, for example 4 seconds, for the main parachute to open. The cam closes the valve 13 for a predetermined time, for example 5 seconds, and then reopens the valve.

The capsule 10 has an operating pin 20 which, in the position shown in the drawing, prevents rotational movement of a lever 21 of a trip mechanism indicated generally at 22. This trip mechanism controls the release of a reserve parachute (not shown). The rip cord of the reserve parachute can be pulled by movement of a rod 23 under the action of a compression spring 24 which urges the rod to the right in the drawing. Movement of the rod is, in the position of the trip mechanism shown, inhibited by a pivoted member 25 which engages the upper end of the lever 21.

As the parachutist falls, the air pressure on the outside of the capsule 10 increases but, so long as the valve 13 is closed, the pressure inside the capsule 10 does not change. Thus the capsule is gradually compressed as the external air pressure increases and the operating pin 20 will move downwards. If the main parachute has opened, the rate of fall is slow and there will be very little movement of the pin 20 before the cam 16 allows the valve 13 to reopen so re-establishing atmospheric pressure in the capsule. In this case the trip mechanism 22 is not released. If the rate of fall is fast, as for example, if the main parachute has not opened, then the pressure change whilst the valve 13 is closed will be much greater. The movement of the pin 20 in this case releases the lever 21 which swings in an anticlockwise direction under the action of the spring force of spring 24 via the lever 25. The movement of the lever 21 causes its end to swing clear of the lever 25 which in turn releases the rod 23 to pulling the rip cord of the reserve parachute.

It will be seen that, quite irrespective of the altitude at which it is operated, immediately before the valve 13 is closed, the pressure in the capsule is equal to the pressure outside the capsule. After the valve is closed, the pressure outside the capsule will gradually increase. If the fall is slow, the valve will be reopened before the pressure difference is sufficient to operate the mechanism 22. If, however, for any reason the fall is too fast, the pressure difference will increase at a more rapid rate and the trip mechanism 22 will be operated before the valve 13 is reopened.

The timer cam might be arranged to give further periods when the valve is closed; each such period would then provide a check to see if the rate of fall is too fast. These further periods of closure of the valve may be provided by means of further lobes on the timer cam 16.

It will be particularly noted that this device for operating a reserve parachute can operate fully automatically and does not have in any way to be set in accordance with altitude or barometric conditions.

I claim:

1. Apparatus for detecting that a rate of fluid pressure change exceeds a predetermined rate comprising:

pressure responsive means for providing an output dependent on a differential between two applied fluid pressures and including a wall element normally dividing an enclosed volume from a surrounding ambient area and movable in response to a differential between pressures therein, pressure balancing means for normally equalizing fluid pressures across said wall element and including a valve for selectively sealing said pressure responsive means against fluctuation of one of said two applied pressures, control means for sequentially closing said valve and maintaining said valve closed during a predetermined time period and automatically reopening said valve on expiration of said predetermined time period and including a release element arranged to initiate mechanically the sequence of functions of said control means, and trip mechanism responsive to the output from said pressure responsive means for indicating that, during said predetermined time period, the rate of change of the other of said applied pressures exceeded said predetermined rate and including a movable member, resilient means biasing said movable member toward a tripped position and latch means operatively coupling said movable member and said pressure responsive means wall element for normally restraining said movable member against movement to said tripped position and for releasing said movable member from restraint upon movement of said wall element beyond a predetermined position.

2. The apparatus defined in claim 1 wherein said pressure responsive means comprises a capsule having a flexible wall portion functioning as said element; said pressure balancing means comprises a fluid passage for admitting ambient fluid pressure to the interior of said capsule, and said valve is operative to close said fluid passage.

3. Apparatus for controlling the release of a reserve parachute comprising a compressible pressure capsule subjected externally to atmospheric pressure, a passage connecting the interior of said capsule to the atmosphere, a valve for closing said passage, timing means operatively controlling said valve for closing said valve and for automatically reopening said valve after a predetermined time period during which said valve is closed, and a trip mechanism operatively controlled by said capsule for releasing said reserve parachute when the compression of the capsule during said predetermined time period exceeds a predetermined amount.

4. Apparatus as claimed in claim 3 wherein said timing means includes a timer cam controlling the valve.

5. Apparatus as claimed in claim 3 wherein said timing means includes a timer cam shaped to give a delay period, after initiation of operation of the timer cam, before the valve opens and is shaped to close the valve at a predetermined time after it is opened.

6. The apparatus defined in claim 3 wherein said passage comprises a compensating chamber having a volume in excess of the change of volume of the capsule.

References Cited

UNITED STATES PATENTS

| | | | |
|---|---|---|---|
| 2,091,300 | 8/1937 | Bassett et al. | 244—78 |
| 2,525,608 | 10/1950 | Kuntz | 244—150 |
| 2,689,006 | 9/1954 | Lindsay | 74—3.54 |
| 2,710,218 | 6/1955 | Frazier | 244—150 |
| 3,058,310 | 10/1962 | Panissidi | 91—35 |
| 3,180,359 | 4/1965 | Miller | 91—35 |

MILTON BUCHLER, Primary Examiner

J. E. PITTENGER, Assistant Examiner

U.S. Cl. X.R.

74—3.54; 137—81